United States Patent
Tsubuko et al.

(10) Patent No.: US 7,670,742 B2
(45) Date of Patent: Mar. 2, 2010

(54) RECORDING MATERIAL, TONER, LIQUID DEVELOPER AND IMAGE FORMING METHOD USING THE SAME

(75) Inventors: Kazuo Tsubuko, Numazu (JP); Tsuyoshi Asami, Yokohama (JP); Aiko Yamazaki, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 713 days.

(21) Appl. No.: 11/374,131

(22) Filed: Mar. 14, 2006

(65) Prior Publication Data

US 2006/0222985 A1 Oct. 5, 2006

(30) Foreign Application Priority Data

Mar. 15, 2005 (JP) ............................. 2005-073780
Jun. 3, 2005 (JP) ............................. 2005-163792
Sep. 13, 2005 (JP) ............................. 2005-264554

(51) Int. Cl.
*G03G 9/12* (2006.01)

(52) U.S. Cl. ....................................... 430/114; 430/115

(58) Field of Classification Search ................ 430/114, 430/115

See application file for complete search history.

(56) References Cited

U.S. PATENT DOCUMENTS

| | | | | |
|---|---|---|---|---|
| 3,615,392 | A * | 10/1971 | Honjo | 430/45.1 |
| 4,400,214 | A * | 8/1983 | Ogawa et al. | 106/1.13 |
| 5,851,717 | A | 12/1998 | Tsubuko et al. | |
| 5,952,048 | A | 9/1999 | Tsubuko et al. | |
| 6,020,103 | A * | 2/2000 | Tsubuko et al. | 430/114 |
| 6,337,168 | B1 * | 1/2002 | Almog | 430/114 |
| 6,376,147 | B1 * | 4/2002 | Bonsignore et al. | 430/114 |
| 6,403,272 | B1 * | 6/2002 | Kamada et al. | 430/110.2 |
| 6,447,973 | B1 | 9/2002 | Asami et al. | |
| 6,522,852 | B1 | 2/2003 | Tsubuko et al. | |
| 6,620,569 | B2 | 9/2003 | Tsubuko et al. | |
| 6,692,881 | B2 | 2/2004 | Tsubuko et al. | |
| 6,939,655 | B2 | 9/2005 | Tsubuko et al. | |
| 2002/0081515 | A1 | 6/2002 | Tsubuko et al. | |
| 2003/0186157 | A1 * | 10/2003 | Teraoka et al. | 430/114 |
| 2004/0005510 | A1 | 1/2004 | Asami et al. | |
| 2004/0010075 | A1 | 1/2004 | Tsubuko et al. | |
| 2004/0259015 | A1 | 12/2004 | Tsubuko et al. | |
| 2005/0250028 | A1 * | 11/2005 | Qian et al. | 430/114 |

FOREIGN PATENT DOCUMENTS

| | | | |
|---|---|---|---|
| GB | 901196 | A * | 7/1962 |
| JP | 54-126958 | | 10/1979 |

(Continued)

OTHER PUBLICATIONS

English translation of JP 2006-039442 (Feb. 2006).*

(Continued)

*Primary Examiner*—Christopher RoDee
(74) *Attorney, Agent, or Firm*—Oblon, Spivak, McClelland, Maier & Neustadt, L.L.P.

(57) ABSTRACT

It is an object of the present invention to provide a recording material which contains at least a colorant and a resin wherein the colorant contains silver, and a toner which contains at least a colorant and a resin wherein the colorant is an alloy containing silver, zinc and aluminum.

22 Claims, 5 Drawing Sheets

FOREIGN PATENT DOCUMENTS

| | | |
|---|---|---|
| JP | 54-126959 | 10/1979 |
| JP | 60-158461 | 8/1985 |
| JP | 63-88893 | 4/1988 |
| JP | 4-237062 | 8/1992 |
| JP | 4-237063 | 8/1992 |
| JP | 4-237064 | 8/1992 |
| JP | 4-237065 | 8/1992 |
| JP | 4-237066 | 8/1992 |
| JP | 7-245468 | 9/1995 |
| JP | 8-32232 | 2/1996 |
| JP | 8-70169 | 3/1996 |
| JP | 8-97539 | 4/1996 |
| JP | 10-209606 | 8/1998 |
| JP | 2001-5217 | 1/2001 |
| JP | 3147621 | 1/2001 |
| JP | 2001-265054 | 9/2001 |
| JP | 2001-265066 | 9/2001 |
| JP | 2001-265122 | 9/2001 |
| JP | 2001-281919 | 10/2001 |
| JP | 3281476 | 2/2002 |
| JP | 2002-151828 | 5/2002 |
| JP | 3326702 | 7/2002 |
| JP | 2002-244337 | 8/2002 |
| JP | 2002-244342 | 8/2002 |
| JP | 3364809 | 11/2002 |
| JP | 2003-25594 | 1/2003 |
| JP | 2003-518327 | 6/2003 |
| JP | 2004-62032 | 2/2004 |
| JP | 2004-93783 | 3/2004 |
| JP | 2004-95648 | 3/2004 |
| JP | 2004-152804 | 5/2004 |
| JP | 2004-184598 | 7/2004 |
| JP | 2004-200473 | 7/2004 |
| JP | 2004-333591 | 11/2004 |
| JP | 2005181621 A * | 7/2005 |
| JP | 2006039442 A * | 2/2006 |
| JP | 2006039475 A * | 2/2006 |
| WO | WO 99/52335 | 10/1999 |

OTHER PUBLICATIONS

English translation of JP 2005-181621 (Jul. 2005).*
English translation of JP 2003-086926 (Mar. 2003).*
English translation of JP 2001-265066 (2001).*
Diamond, Arthur S & David Weiss (eds.) Handbook of Imaging Materials, 2nd ed.. New York: Marcel-Dekker, Inc. (Nov. 2001) pp. 242-247 & 254-257.*
U.S. Appl. No. 09/472,575, filed Dec. 27, 1999, Tsubuko, et al.
U.S. Appl. No. 11/374,131, filed Mar. 14, 2006, US2006/0222985, Tsubuko, et al.

* cited by examiner

RECORDING MATERIAL, TONER, LIQUID DEVELOPER AND IMAGE FORMING METHOD USING THE SAME

BACKGROUND OF THE INVENTION

1. Field of the Invention

The present invention relates to recording material such as electrophotographic toner, inkjet ink, and the like, toner, liquid developer and image forming method using recording material, toner and liquid developer. Moreover, the present invention also relates to an effective technology for production of electric wiring circuits which transfer conductive toner to $Al_2O_3$ containing sheet and IC tags in the field of application.

2. Description of the Related Art

Developers for electrophography can be classified into dry toners and liquid toners. Liquid toners have an advantage of being able to obtain clear image because toner particle diameters are small. Liquid toners in general are produced by dispersing binding resin, colorant and charge control in a nonaqueous medium with high resistance and making toner particles of approximately 0.1 µm to 2.0 µm in particle diameter. The liquid toners also have advantages of having light workload for machines and being able to correspond to high-speed printing because they do not use heavy iron powder carrier as in the process which uses dry toners in an image forming method. However, output of appropriate gold and silver colors by color copiers or on demand electrophotographic printing had been difficult.

In the field of electric wiring circuit production on the other hand, a printing system in which a wiring circuit is printed on an insulating substrate such as polymer film or ceramics substrate using a conductive ink had been a mainstream in the past. However, the printing system required a mask on which a master drawing for making wiring circuit is drawn and made production process complicated and this led to an increase in cost.

In particular, printing was performed using a mask at every layer in the printing process of wiring pattern and different masks had to be prepared and used for different wiring patterns. Therefore it is more advantageous for printing a wiring pattern on an insulating substrate by electrophotography than doing it by conventional printing system in terms of work and cost. Many technologies relating to electrophotography such as the ones disclosed in the following (1) to (9) for example, had been proposed.

(1) A technology relating to a charge powder for wiring substrate having a structure in which conductive metal particles are coated with a thermoplastic resin and powder of a charge control agent is fixed on the outerwall surface of the conductive metal particles (Japanese Patent Application Laid-Open (JP-A) No. 04-237062).

(2) A technology relating to a chargeable particle for circuit printing in which organic aluminum compounds, metal powder and charge control agent are dispersed in a resin binder (JP-A No. 04-237063).

(3) A technology relating to a chargeable particle for printing in which metal powder and charge control agent are dispersed in a resin which does not get softened by heat and pressure and the particle is coated with a thermoplastic resin (JP-A No. 04-237064).

(4) A technology in which a charge particle is selected using certain equipment and a technology in which a circuit of low resistance and high density is produced by the former technology (JP-A No. 04-237065).

(5) A technology for manufacturing process of charge powder which contains a process of obtaining a first powder by performing each of thermofusion, kneading and crushing of conductive metal powder, resin and charge control agent one or more times and a process of obtaining a second powder by crushing and dispersing the first powder after rekneading (JP-A No. 04-237066).

(6) A technology which transfers and forms a wiring pattern on a member using a toner which contains an activator consisting mainly of resin and metal chloride (JP-A No. 54-126958).

(7) A technology for producing a circuit substrate by performing a thin coating on a wiring pattern after transferring the wiring pattern on a substrate using a toner which contains an activator consisting mainly of resin and metal chloride (JP-A No. 54-126959).

(8) A technology which uses 1,2-quinone diazide-based radiation-sensitive developer in which an organic solvent is added in an alkali solution in an amount of 0.05% by mass to 1.0% by mass which is the amount effective to be used as a photoresist in an integrated circuits (JP-A No. 60-158461).

(9) A technology for producing a printed substrate in which a wiring pattern is transferred on to a flexible printing substrate on which an adhesion bond containing a conductive metal powder is coated (JP-A No. 63-88893).

Of these conventional art literatures, technologies stated in above (1), (2), (3), (4) and (5) are related to production of dry toner using conductive metal particles. Technologies stated in above (6), (7), (8) and (9) are related to formation of wiring pattern, production of circuit substrate, printing substrate coated with radiation-sensitive developer and adhesive bond, and the like.

Conventional plastic substrates and ceramics substrates had problems such that the toner image does not get transferred appropriately in the transfer process of electrophotography and wiring circuit defects are developed leading to conductive failures. In addition, they also had low resolution and cross talks.

Moreover, a circuit pattern formation using wet electrophotography is known as disclosed in JP-A No. 2002-151828, for example, however, this method requires firing of formed images and it is difficult to correspond to paper or plastic base.

As stated above, conventional plastic substrates and ceramics substrates had problems such that the toner image does not get transferred appropriately in the transfer process of electrophotography and wiring circuit defects were developed leading to conductive failures. In addition, conductivity and resolution were low and they had cross talks.

SUMMARY OF THE INVENTION

It is an object of the present invention to provide recording material, toner, liquid developer and image forming method using these recording material, toner and liquid developer which can faithfully reproduce a wiring circuit with no conductive failures and a complex electric circuit with high resolution such as IC tags, etc. when used in a wiring pattern formation by electrophotography. It is also an object of the present invention to print an appropriate silver color in electrophotography.

The present inventors have found that it is possible to equalize toner particles by using an alloy powder of silver, zinc and aluminum as a colorant of the toner, and it is also possible to have more metallic luster and to improve conductivity by mixing in gold, copper, platinum and nickel as metal additives.

Moreover, it was found that it is possible to obtain a gold ink record with high image density by forming and developing a thin layer of toner on a roller or a belt to smooth out the toner layer and to have more metallic luster. Furthermore, it is also possible to produce appropriate wiring patterns or IC tags, etc. without having conductive failures when the method was applied to the production of wiring patterns or IC tags, and the like.

The recording material of the present invention at least contains a colorant and a resin and the colorant contains silver.

The toner of the present invention at least contains a colorant and a resin and the colorant is an alloy containing silver, zinc and aluminum.

The liquid developer of the present invention contains the toner of the present invention which is dispersed in a carrier liquid.

The image forming method of the present invention forms and develops a thin layer of the liquid developer of the present invention on a roller or a belt.

DESCRIPTION OF THE PREFERRED EMBODIMENTS (Recording Material)

The recording material of the present invention at least contains a colorant and a resin and further contains other elements as necessary.

A preferred embodiment of the recording material is a recording material which is dispersed in a carrier liquid and the carrier liquid is one of aliphatic hydrocarbon, silicone oil, liquid paraffin, polyalfaolefin and vegetable oil.

The carrier liquid is not particularly limited and may be selected accordingly. It is preferably a solvent with an electric resistance of $10^{10}$ Ωcm or more and a dielectric constant of 3 or less. Examples of such solvent include aliphatic hydrocarbon, silicone oil and polyalfaolefin.

Examples of aliphatic hydrocarbon include Isopar C, Isopar E, Isopar G, Isopar H, Isopar L, Isopar M and Isopar V manufactured by Exxon Mobil Corporation.

Examples of silicone oil include KF-96 1 cSt to 10,000 cSt manufactured by Shin-Etsu Chemical Co., Ltd.; SH-200 and SH-344 manufactured by Dow Corning Toray Co., Ltd.; and TSF451 manufactured by GE Toshiba Silicones.

Examples of polyalfaolefin include SHF-20, SHF-21, SHF-23, SHF-41, SHF-61, SHF-63, SHF-82, SHF-83, SHF-101, SHF-403, SHF-1003, SuperSyn2150, SuperSyn2300, SuperSyn21000 and SuperSyn23000 manufactured by Exxon Mobile Corporation.

The colorant contains silver as primary component. The purity of silver particles is preferably 98% or more. When the purity is less than 98% because of too much impurity incorporated during silver particle production or inclusion of materials for form alteration of silver particles and prevention of aggregation between silver particles, electric resistance becomes high and objective electrical conductivity cannot be obtained.

The silver particles are preferably produced by chemical reduction. The chemical reduction is a method for obtaining silver by having water-soluble silver salts such as silver nitrate as ingredients and using reducers such as caustic alkali, ammonium salt, hydrazine, and the like. The silver particles can be obtained by washing, drying and crushing silver deposited by a reducer.

The silver particles obtained by the chemical reduction can be commercialized products and examples include SILCOAT AgC-BO, AgC-74, AgC-H, AgC-B, AgC-BW and AgC-GS manufactured by Fukuda Metal Foil & Powder Co., Ltd., Ag-025, Ag-110, Ag-119, Ag-128, Ag-520, Ag-531 and Ag-532 manufactured by Shoei Chemical Inc., and the like.

Both granular and flat silver particles are usable; however, the silver particle is preferably containing 50% or more of flat particles which satisfies the relations $dl/ds \geq 1.1$ and $dl/dt \geq 3.0$. In above equations, "dl" represents a maximum particle diameter, "ds" represents a minimum particle diameter and "dt" represents a maximum particle diameter in thickness direction. It shows more metallic luster by containing 50% or more of flat particles. Also, in an electric wiring pattern, connections between silver particles are improved and resistance can be lowered.

The same material as used for the toner which will be described later may be used for the resin.

The recording material is not particularly limited and may be selected accordingly. It is favorably used as an ink for inkjet recording and a liquid toner.

(Toner)

The toner of the present invention at least contains a colorant and a resin and further contains other components as necessary. The colorant is an alloy containing silver, zinc and aluminum.

The toner of the present invention has an embodiment in which the surface of above-specified alloy particles is coated with resin. The resin is mainly used for giving toner particles fixing property, dispersing property and transfer property. Specific examples of such resin include polyolefin resins such as natural resin, styrene-butadiene copolymer, acrylic resin, polyethylene, polypropylene, and the like, vinyl chloride resin, vinyl acetate resin, and the like.

In the case of toner, it is preferable to use a polymer obtained from at least one poorly-soluble or insoluble resin in a carrier liquid with high insulation properties and at least one monomer in which the resin is soluble as a resin for the developer of the present invention.

Examples of poorly-soluble or insoluble resins in a carrier liquid with high insulation properties appropriately used for such combinations include natural resins such as ester gum, hardened rosin, and the like, natural resin modified heat curable resins such as natural resin modified maleic acid resin, natural resin modified phenol resin, natural resin modified polyester resin, natural resin modified pentaerythritol resin, and the like. Examples of monomer in which these resins are soluble include a vinyl monomer expressed by the following General Formula and a polymer obtained from the monomer, the natural resin and the natural resin modified heat curable resin are combined together.

General Formula

In above General Formula, "R" represents —H or —$CH_3$ group, "A" represents —$COOC_nH_{2n+1}$ or —$OCOC_nH_{2n+1}$ group and "n" represents an integer of 6 to 20.

And copolymers of vinyl monomers with glycidyl methacrylate, glycidyl acrylate, propyleneglycol monoacrylate, hydroxyethyl methacrylate, acrylonitrile and methacrylonitrile including graft polymerization are also effective.

The above resin is preferably containing two or more resins and having a structure in which a first resin contains silver particles and a second resin is attached and absorbed on to the first resin for example, is more preferable. The first resin is prescribed for the purpose of containing silver particles and fixing them onto a recording medium. The second resin is prescribed for the purpose of preventing aggregation between toner particles in a dispersion medium and increasing charge of the toner. Further, it is preferable to add a third resin when a charge improving effect is low with only the second resin.

The first resin is preferably a resin with high insulation properties and a polyolefin resin is particularly preferable.

Examples of polyolefin resin, ethylene-vinyl acetate copolymers include EVAFLEX series manufactured by Du Pont-Mitsui Polychemicals Co., Ltd. including 45×, Y-W, 150, 210, 220, 250, 260, 310, 360, 410, 420, 450, 460, 550, 560, and the like; 510X, 515F, 530, 537, 537L, 537S, 525, 520F, 540, 540F, 541, 541L, 625, 630, 630F, 682, 627, 631, 633, 680, 681, 635, 634, 710, 720, 722, 725, 751, 760, and the like manufactured by Tosoh Corp.; DD-10, HA-20, HC-10, HE-10, KA-20, KA-31, KC-10, KE-10, MB-11, RB-11, and the like manufactured by Sumitomo Chemical Co., Ltd.; SOARBLEN series BH, CH, CI, DH, and the like and RBH, RCH, RDH, and the like manufactured by The Nippon Synthetic Chemical Industry Co., Ltd.; Dumilan series D-219, D-229, D-251S, C-2280 C-2270, C-1590, C-1570, C-1550, and the like manufactured by Mitsui Takeda Chemicals, Inc.; YUKALON-EVA manufactured by Mitsubishi Chemical Corporation.; and Elvax® manufactured by Dupont U.S.A.

Examples of low-molecular-weight polyolefin resin include Hi-wax 720P, 410P, 420P, 320P, 210P, 220P, 110P, 4202E, and the like manufactured by Mitsui Chemicals, Inc.

Examples of polyolefin resin modified resins with carboxyl group introduced include N polymer manufactured by Nippon Petrochemicals Co., Ltd.; CMP-HA series manufactured by Tonengeneral Sekiyu K.K.; MODIC manufactured by Mitsubishi Chemical Corporation; Zaiksen manufactured by Sumitomo Seika Chemicals, Co., Ltd.; Lonply and ADMER® manufactured by Mitsui Chemicals, Inc., and the like.

Examples of copolymers of ethylene and acrylic acid include Dow EAA copolymer manufactured by The Dow Chemical Co.; YUKALON-EAA manufactured by Mitsubishi Chemical Corporation; NUCREL manufactured by Du Pont-Mitsui Polychemicals Co., Ltd.; and ACRYFT manufactured by Sumitomo Chemical Co., Ltd., and the like.

Examples of copolymers of ethylene and acrylic acid or ethylene and methacrylic acid or ionomers crosslinking thereof include Surlyn® manufactured by Dupont U.S.A.; Himilan manufactured by Du Pont-Mitsui Polychemicals Co., Ltd.; Corbolin Latex manufactured by Asahi Kasei Chemicals Corp., EVA1wax addition manufactured by BASF Corporation, and the like.

Examples of copolymers of ethylene and acrylic acid ester include DPD-6169 manufactured by Union Carbide Corporation, and the like.

And polyolefin resin containing carboxylic carbonyl group, and the like can be used for the first resin.

Other examples include polyester resin, styrene acrylic resin, epoxy resin, natural resin, styrene-butadiene copolymer, vinyl chloride resin, vinyl acetate resin, and the like.

The second resin is preferably an acrylic resin and more preferably a resin containing an area having high affinity for the first resin, an area having high affinity for dispersion medium and an area retaining electric charge.

Examples of the second resin include copolymers of each one of methacrylate or ethacrylate expressed by following General Formula and monomers selected from vinyl monomer, vinyl pyridine, vinyl pyrolidone, ethylene glycol dimethacrylate, styrene, divinylbenzene and vinyltoluene or copolymers of several of these, graft copolymers, and the like.

General Formula (1)

In above General Formula (1), $R_1$ represents hydrogen atom, $CH_3$ group or ethyl group, and "n" represents an integer of 0 to 20.

General Formula (2)

In above General Formula (2), $R_1$ represents hydrogen atom, $CH_3$ group or ethyl group, $R_3$ represents hydrogen atom or carboxyl group, $R_4$ represents a group having carbon number 1 to 8 which may have a cyclic group, and when $R_4$ is having a cyclic group, the cyclic group may have a hetero atom.

Examples of monomers expressed by above General Formula (1) include methacrylate or ethacrylate monomers with "n" being 0 to 4 such as acrylic acid ($R_1$=H group and n=0), methacrylic acid ($R_1$=$CH_3$ group and n=0), ethacrylic acid ($R_1$=ethyl group and n=0), methyl acrylate ($R_1$=H group and n=1), methyl methacrylate ($R_1$=$CH_3$ group and n=1), methyl ethacrylate ($R_1$=ethyl group and n=1), ethyl acrylate ($R_1$=H group and n=2), ethyl methacrylate ($R_1$=$CH_3$ group and n=2), ethyl ethacrylate ($R_1$=ethyl group and n=2), propyl acrylate ($R_1$=H group and n=3), propyl methacrylate (iso-propyl methacrylate with $R_1$=$CH_3$ group and n=3), propyl ethacrylate ($R_1$=ethyl group and n=3), butyl acrylate ($R_1$=H group and n=4), butyl methacrylate ($R_1$=$CH_3$ group and n=4), butyl ethacrylate ($R_1$=ethyl group and n=4), and the like and methacrylate or ethacrylate monomers with "n" being 6 or more such as lauryl methacrylate, lauryl ethacrylate, stearyl methacrylate, 2-ethylhexyl methacrylate, cetyl methacrylate, and the like. Of above methacrylate or ethacrylate monomers, methacrylate or ethacrylate monomers with "n" being 0 are ionic monomers and it is capable of becoming an area which retains electric charge after polymerization. Moreover, methacrylate or ethacrylate monomers with "n" being 1 to 4 are capable of becoming a poorly soluble area in a dispersion medium after polymerization while having high affinity for the first resin. And methacrylate or ethacrylate monomers with "n" being 6 or more are capable of becoming an area having high affinity for a dispersion medium after polymerization.

$R_4$ which is a group having carbon number 1 to 8 which may have a cyclic group in the monomer expressed by General Formula (2) may be a group having a hetero atom and it is preferably a group having a hetero atom of at least one of nitrogen or oxygen atom. Examples of groups having a nitrogen atom as hetero atom include aliphatic group having first, second and third amines, alicyclic amino group or pyridine group. Examples of groups having an oxygen atom as hetero atom include groups having methacrylate or ethacrylate, oxetane groups such as epoxy group and glycidyl group, and the like. Examples of $R_4$ groups having carbon number 1 to 8 which may have a cyclic group include phenyl group, toluyl group, vinylphenyl group, phenylsulfone group, and the like.

Specific examples of these compounds include unsaturated dicarboxylic acid compounds with both $R_3$ and $R_4$ being carboxyl groups and $R_1$ being H group, $CH_3$ group or ethyl group such as itaconic acid, maleic acid, fumaric acid, and the like. And vinyl lactam compounds with both $R_3$ and $R_1$ being H groups (hydrogen group) and each $R_4$ being piperidyl group, pyrolidone group, caprolactam group, phenyl group, toluyl group, vinylphenyl group and phenylsolfone group such as vinylpiperidine, vinylpyrolidone, vinylcaprolactam, vinyl laurolactam, and the like; styrene, vinyltoluene, divinylbenzene, styrenesolfonic acid or salt compound thereof, and the like. Specific examples of aliphatic group with $R_1$ being H group, $CH_3$ group or ethyl group, $R_3$ being hydrogen group and $R_4$ being first, second and third amines include aminomethylacrylate, aminomethylmethacrylate, aminoethylacrylate, aminoethylmethacrylate, aminopropylacrylate, aminopropylmethacrylate, dimethylaminomethylacrylate, dimethylaminomethylmethacrylate, dimethylaminoethylacrylate, dimethylaminoethylmethacrylate, diethylaminomethylacrylate, diethylaminomethylmethacrylate, diethylaminoethylacrylate, diethylaminoethylmethacrylate, diethylaminopropylacrylate, diethylaminopropylmethacrylate, and the like. Examples of groups with $R_1$ being H group, $CH_3$ group or ethyl group, $R_3$ being hydrogen group and $R_4$ being methacrylate or ethacrylate include ethylene glycoldiacrylate, ethylene glycoldimethacrylate, glycerin diacrylate, glycerin dimethacrylate, and the like. Examples of groups with $R_1$ being H group, $CH_3$ group or ethyl group, $R_3$ being hydrogen group and $R_4$ being oxetane group such as epoxy group and glycidyl group include glycidyl acrylate (GA), glycidyl methacrylate (GMA), and the like.

Examples of monomers having high affinity for a dispersion medium after polymerization include laurylmethacrylate, stearylmethacrylate, 2-ethylhexylmethacrylate, cetylmethacrylate, and the like.

Examples of monomers having high affinity for the first resin and being poorly soluble in a dispersion medium after polymerization include methylmethacrylate, ethylmethacrylate, isopropylmethacrylate, styrene, vinyltoluene, and the like.

Examples of monomers having a polar group which has a tendency to be negatively charged include acrylic acid, methacrylic acid, itaconic acid, fumaric acid, maleic acid, styrenesulfonic acid, and salt thereof.

Examples of monomers having a polar group which has a tendency to be negatively charged include dimethylaminoethylmethacrylate, vinylpyrolidone, vinylpiperidine, vinyl lactam, vinylpyridine, and the like.

The mass ratio of the first resin to the second resin (first resin:second resin) is preferably 95:5 to 50:50. The content of the first resin in the total resin amount is preferably 50% or more because the first resin needs to cover silver particles. When the second resin is less than 5% of total resin amount, effects of preventing aggregation and improving charging ability may be deteriorated.

The mass ratio of the alloy in the toner to the resin (alloy: resin) is preferably 65:35 to 95:5. When the ratio of the alloy relative to the resin is less than 65%, it is impossible to obtain an image of strong metallic luster. If the alloy is used for conductive circuit, the quality may be deteriorated because of high resistance. When the ratio of the alloy relative to the resin is more than 95%, the ratio covering the alloy with resin is lowered, the resistance of toner particles is lowered, developing efficiency is also lowered and may lead to deterioration of image quality such as resolution ability, density, etc.

The toner and the ink for inkjet recording of the present invention are constructed by dispersing alloy particles (colorant) containing above resin, silver, zinc, aluminum, etc. as main components in a carrier liquid with high insulation properties. A solvent with electric resistance of $10^{10}$ Ωcm or more and dielectric constant of 3 or less is used for the carrier liquid with high insulation properties. It is preferable to use aliphatic hydrocarbon, silicone oil, liquid paraffin, polyalfaolefin, and the like.

The colorant basically is a fine powder of alloy containing Ag, Zn and Al as main components and Au, Cu, Pt and Ni are added. Compounding ratio for Ag is 50% by mass to 95% by mass and it is preferably 70% by mass to 90% by mass. Compounding ratio for Zn is 3% by mass to 40% by mass and it is preferably 10% by mass to 30% by mass. Compounding ratio for Al is 0.1% by mass to 10% by mass and it is preferably 0.5% by mass to 5% by mass.

The alloy particles are obtained by reducing to particles with a particle diameter within the range of 1 μm to 100 μm and preferably 3 μm to 20 μm by cooling or crushing while cooling after mixing each alloy component, heating to the temperature of highest melting point of these metals and melt-kneading.

Moreover, the colorant of the present invention is preferably prepared by add-mixing insulation oils (aliphatic hydrocarbons such as Isopar H, L, M, etc.) and/or higher fatty acids such as oleic acid, naphthene acid, stearic acid, myristic acid, and the like in a ratio of 1 parts by mass to 10 parts by mass and preferably 3 parts by mass to 7 parts by mass relative to 100 parts by mass of above alloy particles. This is to ensure appropriate gold color for the color tone of the colorant and insulation oils and higher fatty acids have effects of polarity control and improvement of dispersing ability and luster of the alloy particles.

The colorant is obtained by kneading the alloy particles with a resin. A flushing colorant, obtained by coating the alloy particles on the resin by flushing, is more preferable and it is possible to improve fixing property. For example, the alloy particles of the present invention which contains silver, zinc and aluminum or hydroscopic paste may be kneaded in a carrier liquid with a substantially insoluble resin and crushed after evaporants are removed.

(Liquid Developer)

The liquid developer of the present invention contains the toner of the present invention which is dispersed in a carrier liquid.

The carrier liquid is not particularly limited and may be selected accordingly. It is preferably a solvent with an electric resistance of $10^{10}$ Ωcm or more and dielectric constant of 3 or less and appropriate examples include aliphatic hydrocarbon, silicone oil and polyalfaolefin.

Examples of aliphatic hydrocarbon include Isopar C, Isopar E, Isopar G, Isopar H, Isopar L, Isopar M and Isopar V manufactured by Exxon Mobil Corporation.

Examples of silicone oil include KF-96 1 cSt to 10,000 cSt manufactured by Shin-Etsu Chemical Co., Ltd.; SH-200 and SH-344 manufactured by Dow Corning Toray Co., Ltd.; and TSF451 manufactured by GE Toshiba Silicones.

Examples of polyalfaolefin include SHF-20, SHF-21, SHF-23, SHF-41, SHF-61, SHF-63, SHF-82, SHF-83, SHF-101, SHF-403, SHF-1003, SuperSyn2150, SuperSyn2300, SuperSyn21000 and SuperSyn23000 manufactured by Exxon Mobile Corporation.

The present invention is an electrophotography particularly effective for producing an electric wiring circuit wherein a latent electrostatic image is developed using a liquid developer by electrophotographic formula and the toner image is transferred on to a transfer member.

The viscosity of the toner is preferably 50 mPa·s or more when measured by B-type viscometer at 60 rpm. When the viscosity is less than 50 mPa·s, it may be impossible to equalize formation of thin layer.

The area of the resin and colorant making up the toner is preferably 10% by mass or more. The density may not be satisfactory if it is less than 10% by mass. Moreover, the average particle diameter of the toner is preferably 1 μm to 15 μm. When the average particle diameter is less than 1 μm, density or conductivity may not be satisfactory, and when it is more than 15 μm, resolution ability may be deteriorated.

Forming an image with conventional electrophotographic copiers, etc. using the toner is possible; however, an image of high density and resolution is obtainable by developing a thin layer of the toner formed on a roller or a belt in the present invention. The layer thickness of approximately 5 μm to 30 μm is preferable. When the layer thickness is less than 5 μm, conductivity and image density may not be satisfactory and when it is more than 30 μm, resolution may be lowered.

The cohesive force and resolution of the toner can be improved by developing a latent electrostatic image after performing a corona discharge on to the liquid toner layer for latent electrostatic image formed on the roller or belt. The corona discharge is highly effective when it has same polarity as the toner and the voltage of approximately 500V to 8,000V is preferable.

A high image quality can be obtained by developing after pre-wet liquid is deposited on to the latent electrostatic image area thereby improving transfer efficiency. An appropriate thickness of pre-wet liquid film is 0.1 μm to 5 μm and preferably 0.3 μm to 1 μm. When it is less than 0.1 μm, it is less effective, and when it is more than 5 μm, resolution is lowered.

A high image quality can be obtained even on a regular paper by forming an image on a transfer member after developing a latent electrostatic image and transferring the toner image on an intermediate transfer body thereby applying transfer pressure. The material of intermediate transfer body is preferably a material having solvent resistance and elasticity such as urethane rubber, nitryl rubber, hydrin rubber, and the like and it is more preferably coated with fluorine resin, and the like.

The cleaning ability can be improved by making the surface of a photoconductor forming a latent electrostatic image water and oil repellent with θ being 30° or more to improve image quality. It is possible to improve water and oil repellent properties by coating a block polymer containing fluorine resin such as MODIPER F200, F210, etc. manufactured by NOF Corp., for example.

Figure 1:
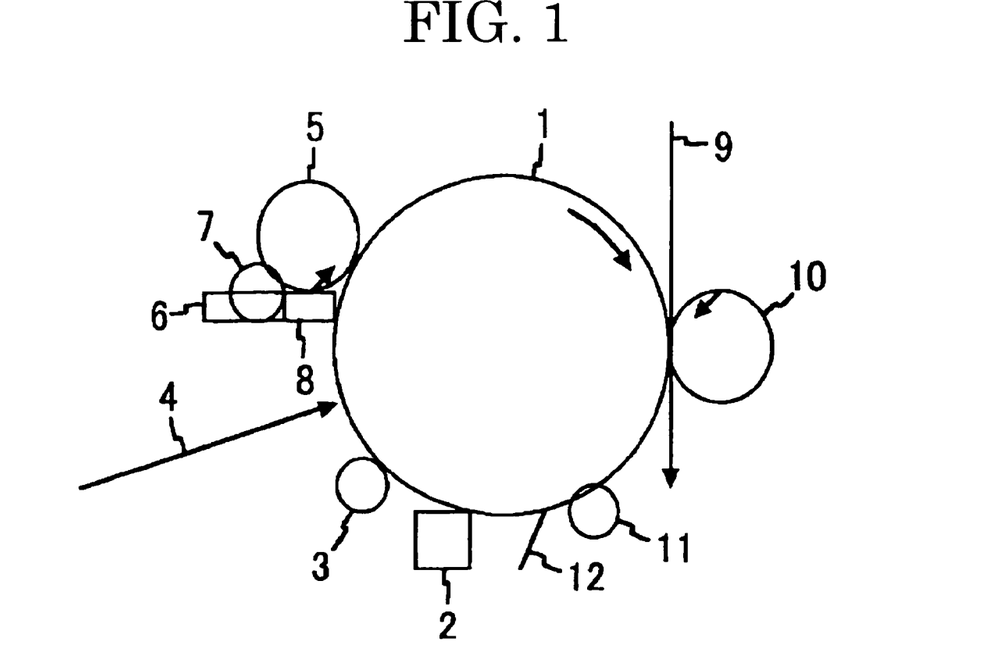
FIG. 1 is a view showing a frame format of an exemplary image forming process of the first image forming method according to the present invention.

The image forming process performed by the image forming method of the present invention will be explained below based on the figures. FIG. 1 is a view showing a frame format of an exemplary image forming process of the first image forming method according to the present invention.

A photoconductor 1 such as organic optical semiconductor, selenium, amorphous silicone, for example is charged by a corona charge 2 while the photoconductor 1 is rotated in an arrow direction.

When a carrier liquid is pre-wetted, it is performed by a roller 3 and writing is performed by an exposure unit 4. Toner is supplied from a toner container 6 by a developing roller 5 and it is coated uniformly by a toner roller 7. The toner layer on the developing roller 5 is applied with a voltage by a corona discharge unit 8 as necessary and the latent image on the photoconductor 1 is developed by the developing roller 5 and visualized. For each roller, rollers of metal, rubber, plastic, with sponge-like appearance and with grooves such as wire bar, gravure roller, etc. are usable.

The toner image on the photoconductor 1 is then transferred on to a transfer member 9 by a transfer roller 10. The image can be formed on the transfer member by applying pressure, corona discharge, heat and combinations of heat and pressure, corona discharge and pressure, corona discharge and heat, etc. The residual toner is removed by using a cleaning roller 11 and a cleaning blade 12 used for cleaning the surface of the photoconductor 1 to prepare for the next image formation.

Figure 2:
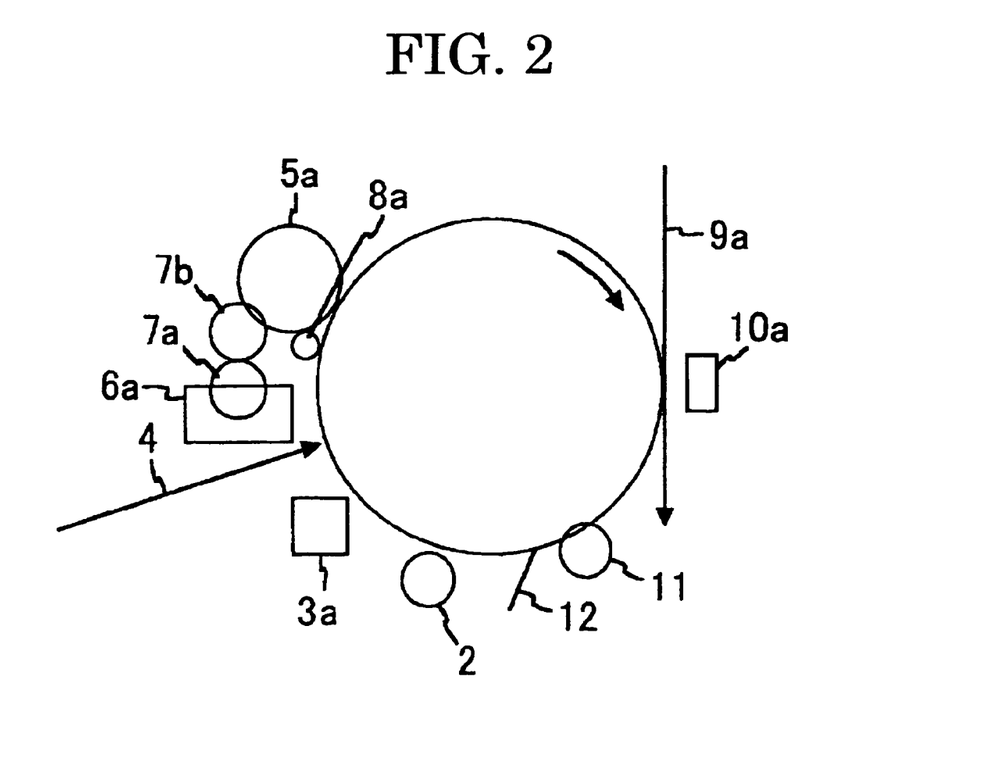
FIG. 2 is a view showing a frame format of an exemplary image forming process of the second image forming method according to the present invention.

FIG. 2 is a view showing a frame format of an exemplary image forming process of the second image forming method according to the present invention.

It differs from FIG. 1 in a coating process in which a pre-wet liquid is coated by a felt 3a instead of the roller 3. The pre-wet liquid is coated by the felt as necessary. Toner is coated onto a developing roller 5a from a toner container 6a through rollers 7a and 7b and a direct voltage is applied to the coated toner layer by a corona discharge unit 8a. The contact width of the developing roller 5a with the photoconductor 1 in FIG. 2 is longer than FIG. 1 in order to develop a latent image satisfactory. The toner image developed on the photoconductor is transferred on to a transfer member 9a by a corona discharge unit 10a to form an image.

Figure 3:
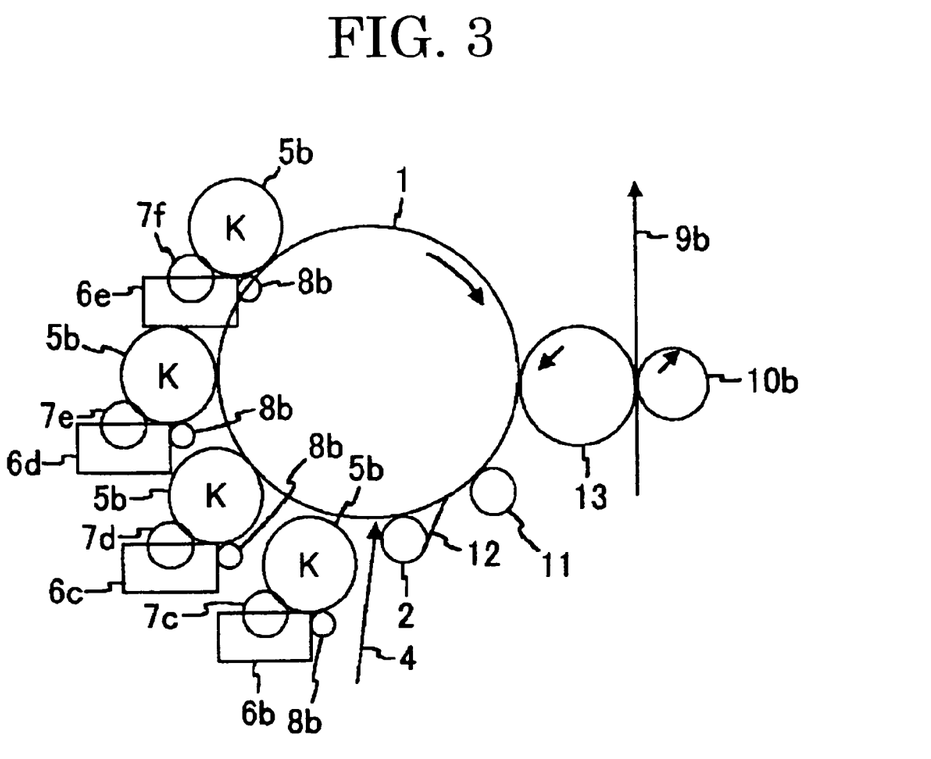
FIG. 3 is a view showing a frame format of an exemplary image forming process when a color copy according to the present invention is printed.

FIG. 3 is a view showing a frame format of an exemplary image forming process when a color copy according to the present invention is printed.

Toners contained in each toner container 6b to 6e of special colors such as gold, silver, etc. and yellow, magenta, cyan and black are developed on the photoconductor 1 one color at a time by the developing roller 5b through rollers 7c to 7f to form a latent image on the photoconductor 1. The formed image is then transferred to a transfer member 9b by a transfer roller 10b by applying pressure, corona, heat, etc. after being transferred to an intermediate transfer body 13.

Figure 4:
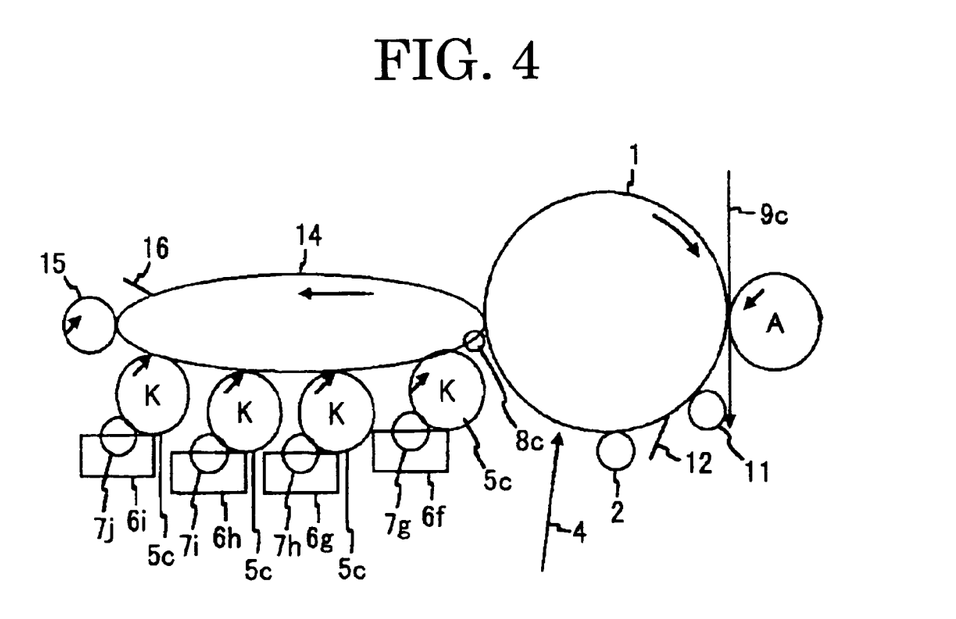
FIG. 4 is a view showing a frame format of another exemplary image forming process when a color copy according to the present invention is printed.

FIG. 4 is a view showing a frame format of another exemplary image forming process when a color copy according to the present invention is printed. It also has toner containers 6f to 6i which contain toners of special colors such as gold, silver, etc. and yellow, magenta, cyan, black and rollers 7g to 7j as similar to FIG. 3. A latent image on a photoconductor 1 is developed by a belt 14 used for coating toner layers and the toner image is transferred to a transfer member 9c. A cleaning roller 15 and a cleaning blade 16 are disposed on the belt 14 used for coating toner layers to make the belt 14 reusable.

Figure 5:
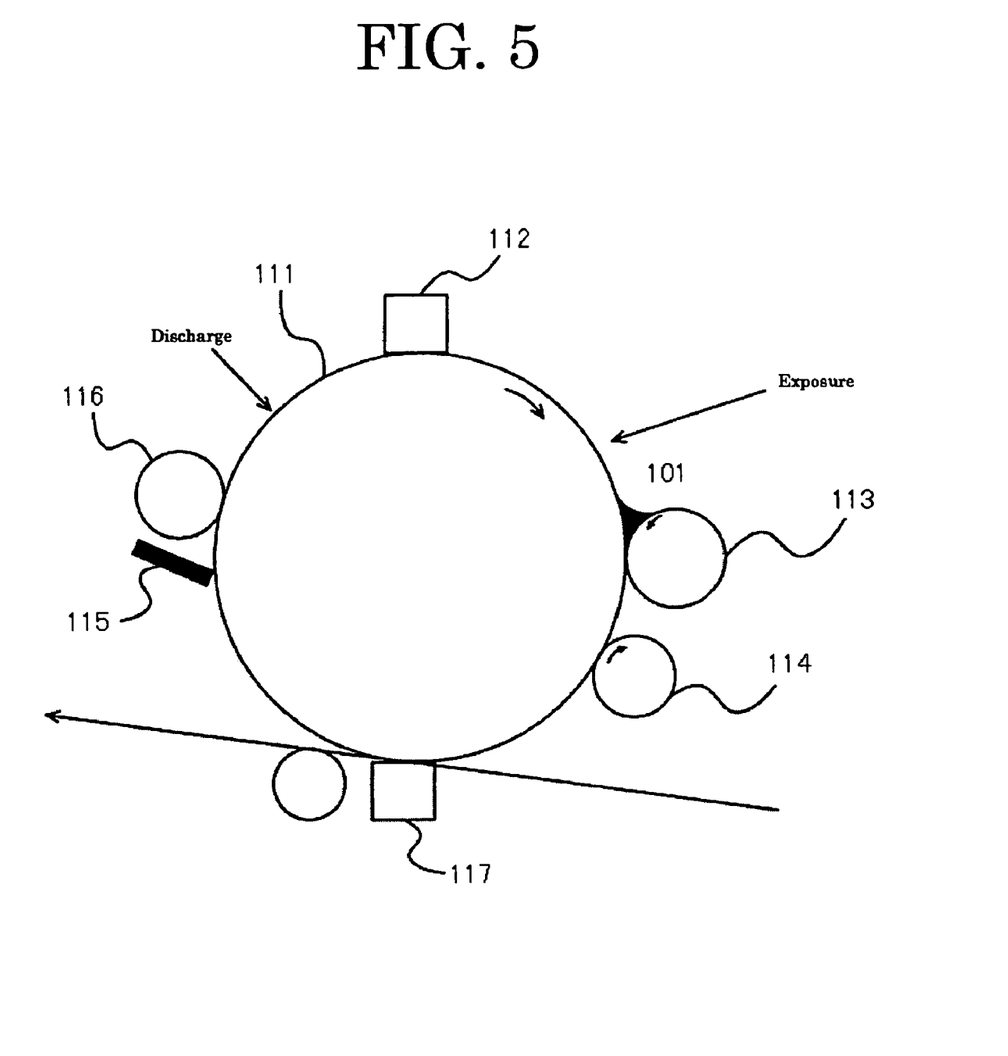
FIG. 5 is a view showing an exemplary image forming apparatus used for the image forming method according to the present invention.

FIG. 5 is a view showing an exemplary image forming apparatus used for the image forming method according to the present invention. A photoconductor 111 is charged by a charging voltage applying member 112 and a charge of the area having no image is erased by exposure.

A selenium photoconductor, organic photoconductor, amorphous silicone photoconductor, etc. are usable as photoconductor 111. A surface voltage of the photoconductor 111 is preferably in the range of 400V to 1,600V.

The latent image retaining charge on the photoconductor 111 is developed using a liquid developer supplied from a developing roller 113, the redundant developer is removed by a squeeze roller 114, a voltage opposite of the charge of toner 101 is applied by a charging voltage applying member 117 and the image is transferred to a recording medium.

The developing roller 113 is rotated in a forward direction of the photoconductor 111 and the squeeze roller 114 is rotated in an opposite direction of the photoconductor 111. It is more effective when the linear velocity of the developing roller 113 relative to the photoconductor 111 is in the range of 1.2 times to 6 times of the linear velocity of the photoconductor 111 and the linear velocity of the squeeze roller 114 is in the range of 1.2 times to 4 times of the linear velocity of the photoconductor 111.

The gap between a roller and a photoconductor is preferably 50 μm to 250 μm and the gap between a reverse roller and a photoconductor is preferably 301 μm to 150 μm. The transfer voltage is preferably in the range of 500V to 4,000V.

The electricity of the photoconductor 111 is removed after removing a residual toner 101 on the photoconductor 111 which is not transferred on to the recording medium by a cleaning blade 115 and a cleaning roller 116. Meanwhile, image formation can be performed by a developing method in which a charge in the image area is removed and a charge in the area with no image is left.

The adhesion amount of toners attached to the recording medium after drying is preferably 0.2 mg/cm$^2$ to 1.5 mg/cm$^2$ and more preferably 0.4 mg/cm$^2$ to 1.2 mg/cm$^2$. When the adhesion amount of toners is less than 0.2 mg/cm$^2$, connections between metal particles are deteriorated with lack of adhesion amount; the resistance goes up and a poor metallic luster may result even with an image with metallic luster. When it is more than 1.5 mg/cm$^2$, resistance value remains the same no matter how much the adhesion amount is increased and resolution ability is lowered because of the image defects. When an adhesion amount of 0.2 mg/cm$^2$ or more cannot be obtained with one developing and transfer cycle, it is preferable to obtain an image of repeated cycles while avoiding misplacement. It is also effective to transfer double or triple images with tandem to improve adhesive amount. It is preferable to transfer directly from a photoconductor to a recording medium in a transfer process. If an intermediate transfer body is used for transfer, specific charge amount of toner particles is lowered as a transfer solvent is reduced and may adversely affect transfer property.

Figure 6:
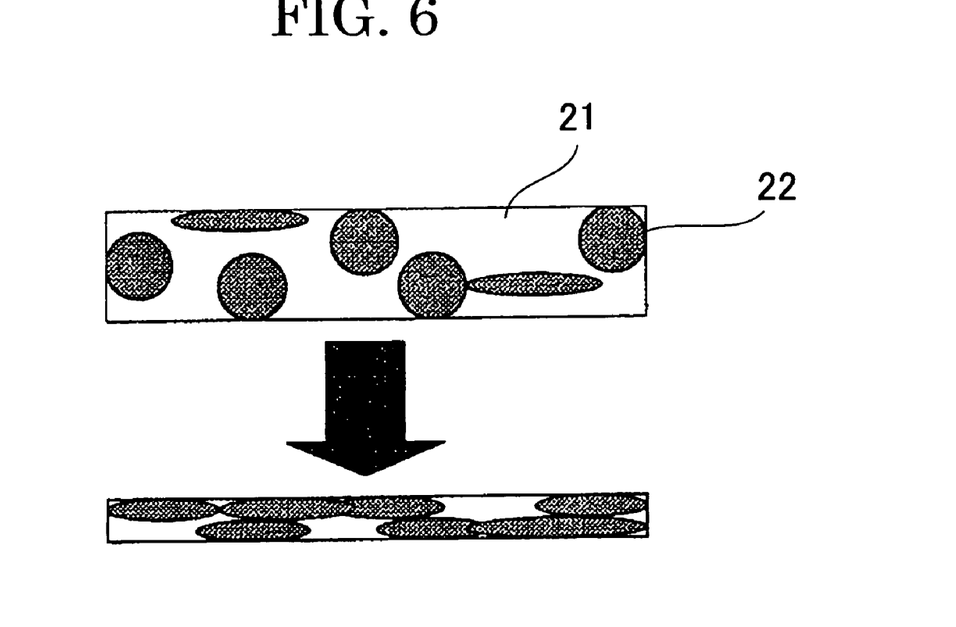
FIG. 6 is a view showing a frame format of an aspect in which contact between silver particles is increased by pressure application after being transferred to a recording medium.

Metallic luster and conductivity can be improved by applying pressure of 10 kg/cm$^2$ to 80 kg/cm$^2$ to the image after transfer. As shown in FIG. 6 for example, a toner layer is compressed by an applied pressure to improve surface flatness and to have more metallic luster. Moreover, the contact between silver particles is increased resulting in higher conductivity. In FIG. 6, 20 indicates a recording medium, 21 indicates a silver particle and 22 indicates a resin.

Figure 7A:
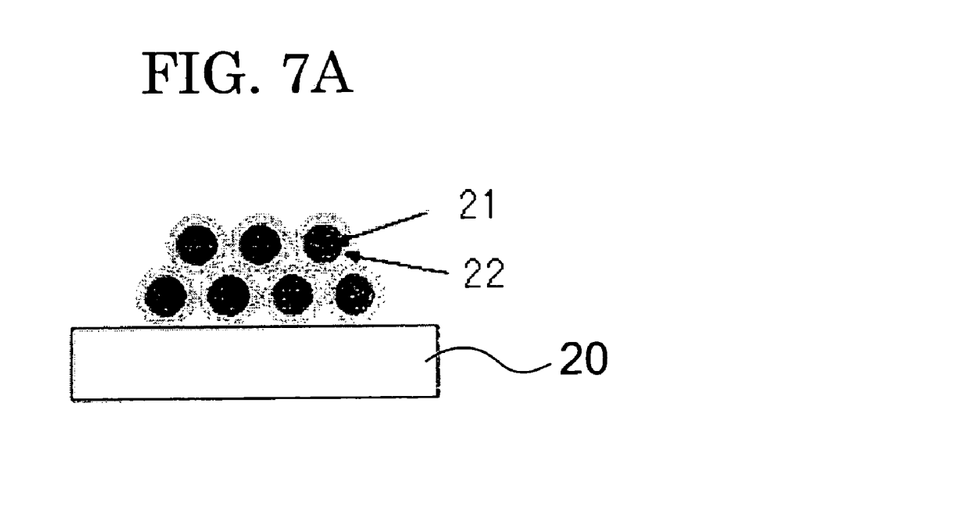
FIG. 7A is a view showing a condition in which a toner is transferred to a recording medium.
Figure 7B:
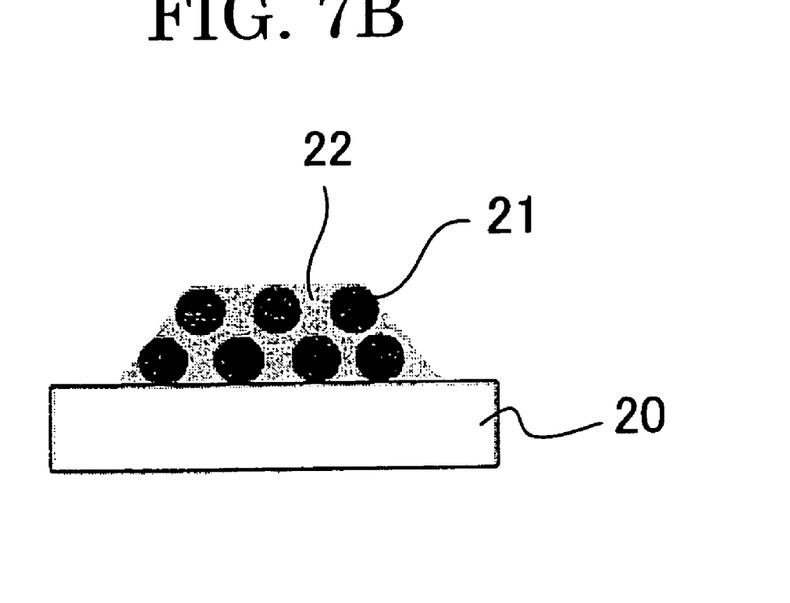
FIG. 7B is a view showing a condition in which the resin is melted by heating and the toner layer is fixed.
Figure 7C:
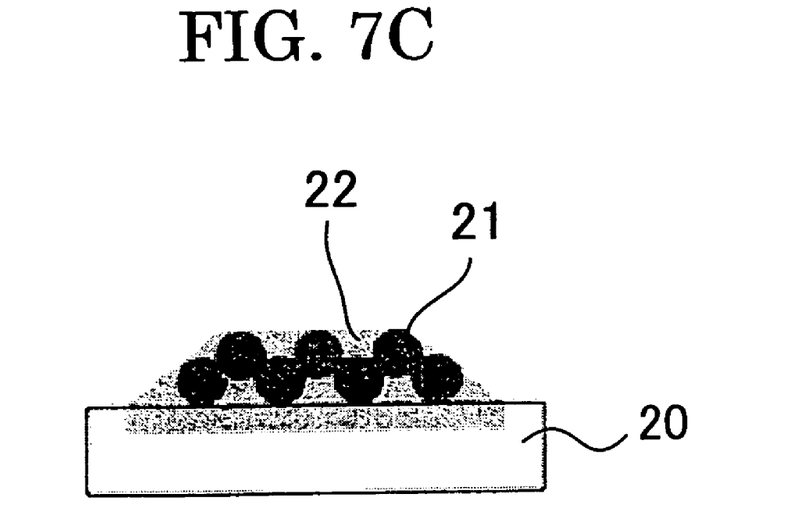
FIG. 7C is a view showing a condition in which the resin is satisfactorily melted by heating after fixing and silver particles are linked to each other.

Furthermore, conductivity is improved as the resin is completely melted and the contact between silver particles is increased by further heating after fixing as shown in FIGS. 7A to 7C for example, by applying heat to the transferred image on the recording medium at a temperature of approximately 150° C. to 230° C. for approximately 3 seconds to 30 seconds after fixing the transferred image on the recording medium at a temperature of 120° C. to 180° C. FIG. 7A shows a condition in which a toner is transferred to a recording medium. FIG. 7B shows a condition in which the resin is melted by heating and the toner layer is fixed. FIG. 7C shows a condition in which the resin is satisfactorily melted by heating after fixing and silver particles are linked to each other. In FIGS. 7A to 7C, 21 indicates a silver particle and 22 indicates a resin.

The toner of the present invention is capable of obtaining an excellent image with metallic luster because the colorant contains silver, zinc, aluminum and platinum as main components and is applicable for production of wiring patterns, IC tags, etc. for its high conductivity.

The toner of the present invention is capable of obtaining an excellent image with metallic luster because the colorant contains silver, zinc, aluminum and nickel as main components and is applicable for production of wiring patterns, IC tags, etc. for its high conductivity.

The toner of the present invention is capable of obtaining an excellent image with metallic luster because the colorant contains silver, zinc, aluminum and gold as main components and is applicable for production of wiring patterns, IC tags, etc. for its high conductivity.

The toner of the present invention is capable of obtaining an excellent image with metallic luster because appropriate content of silver, zinc, aluminum, gold, copper, platinum and nickel in the colorant is ensured and is applicable for production of wiring patterns, IC tags, etc. for its high conductivity.

The toner of the present invention is capable of obtaining a sharp image with strong metallic luster because the colorant is subjected to flushing treatment, and it is also capable of obtaining an excellent image with metallic luster and is applicable for production of wiring patterns, IC tags, etc. because of its high conductivity.

The liquid developer of the present invention is capable of obtaining an excellent image with metallic luster because the carrier liquid is aliphatic hydrocarbon, silicone oil, liquid paraffin, polyalfaolefin and is applicable for production of wiring patterns, IC tags, etc. for its high conductivity.

The toner of the present invention is capable of obtaining an excellent image with metallic luster because of having a viscosity of 100 mPa·s or more and is applicable for production of wiring patterns, IC tags, etc. for its high conductivity.

The toner of the present invention is capable of obtaining an excellent image with metallic luster because the mass of the colorant and resin is 10% by mass or more and is applicable for production of wiring patterns, IC tags, etc. for its high conductivity.

The toner of the present invention is capable of obtaining an excellent image with metallic luster because of an average particle diameter of 0.1 μm to 15 μm and is applicable for production of wiring patterns, IC tags, etc. for its high conductivity.

The toner of the present invention is capable of obtaining an excellent image with metallic luster because the toner is developed in a form of thin layer on a roller or a belt and is applicable for production of wiring patterns, IC tags, etc.

The toner of the present invention is capable of obtaining an excellent image with metallic luster because a latent electrostatic image is developed after performing a corona discharge on the toner layer formed on a roller or a belt and is applicable for production of wiring patterns, IC tags, etc.

The toner of the present invention is capable of obtaining an excellent image with metallic luster because an image is developed after pre-wet liquid is deposited on the latent electrostatic image area and is applicable for production of wiring patterns, IC tags, etc.

The toner of the present invention is capable of obtaining an excellent image with metallic luster because an image is formed on a transfer member after developing a latent electrostatic image and transferring a recording material to an intermediate transfer body to improve resolution and sharpness and is applicable for production of wiring patterns, IC tags, etc.

The toner of the present invention is capable of obtaining an excellent image with metallic luster because the contact angle between a photoconductor which forms a latent electrostatic image and a recording material is 30° or more to improve resolution and sharpness and is applicable for production of wiring patterns, IC tags, etc.

The inkjet ink of the present invention is capable of obtaining an excellent image with metallic luster because the colorant contains silver, zinc and aluminum as main components and is applicable for production of wiring patterns, IC tags, etc. for its high conductivity.

EXAMPLES

The present invention will be explained in detail referring to specific Examples. In following Examples, "parts" represents "parts by mass" and "%" represents "% by mass".

The colorant of the present invention including the colorant containing only alloy components will be mentioned.

-Colorant Particles-
 No. 1: silver 80%, zinc 15%, aluminum 3%, gold 2%
 No. 2: silver 90%, zinc 5%, aluminum 3%, copper 2%
 No. 3: silver 70%, zinc 25%, aluminum 3%, platinum 2%
 No. 4: silver 99%, zinc 0.4%, aluminum 0.2%, nickel 0.4%
 No. 5: A flushing colorant was obtained by kneading 100 parts of No. 1 alloy particles and 500 parts of rosin modified maleic acid resin with 50% of toluene solvent using a kneader at 100° C. for two hours and removing toluene.
 No. 6: A flushing colorant was obtained by kneading 100 parts of No. 2 alloy particles and 700 parts of ethylene-vinyl acetate copolymer (EVAFLEX210) using a kneader at 120° C. for two hours.

Example 1

First, 70 parts of SANWAX 151P (a resin manufactured by Sanyo Chemical Industries, Ltd. with a softening point of 107° C.) and 20 parts of No. 1 colorant metal powder was crushed after being kneaded using a two-roll mill at 140° C. for 30 minutes.

Next, 50 parts of obtained crushed material, 110 parts of 20% solution of Isopar H, a lauryl methacrylate/methacrylic acid/glycidyl methacrylate (80/10/10) copolymer, and 200 parts of Isopar H were put in a ball mill and dispersed for 24 hours and further dispersed for 1 hour with additional 300 parts of Isopar H to obtain a toner.

A latent electrostatic image was developed using obtained toner by an image forming apparatus as shown in FIG. 1.

Example 2

First, 15 parts of No. 2 colorant metal powder and 90 parts of SANWAX E300 (a resin manufactured by Sanyo Chemical Industries, Ltd. with a softening point of 98° C.) were kneaded using a kneader at 120° C. and crushed after subjected to flushing treatment by a flusher.

Next, 60 parts of obtained crushed material, 150 parts of 10% solution of Isopar H, a stearyl methacrylate/methyl methacrylate/methacrylic acid/hydroxymethyl methacrylate (85/7/4/4) copolymer, and 150 parts of Isopar H were introduced in a ball mill and dispersed for 36 hours and further dispersed for 1 hour with additional 250 parts of Isopar H to obtain a toner.

A latent electrostatic image was developed using obtained toner by an image forming apparatus as shown in FIG. 1.

Example 3

First, 50 parts of No. 5 colorant metal powder, 100 parts of 20% solution of J-52, a lauryl methacrylate/glycidyl methacrylate (80/20) copolymer manufactured by Exxon Mobile Corporation, 2 parts of polyoxyethylene alkylether and 300 parts of J-52 were put in a ball mill and dispersed for 24 hours and further dispersed for 1 hour with additional 100 parts of J-52 to obtain a toner.

A latent electrostatic image was developed using obtained toner by an image forming apparatus as shown in FIG. 1.

Example 4

A liquid developer was prepared by dispersing 100 g of toner of Example 1 in 1,000 g of Isopar H. Obtained liquid developer was put in a developing machine, RICOPY 250 manufactured by Ricoh Company, Ltd. and a latent electrostatic image was developed on a zinc oxide photosensitive paper to produce a wiring pattern image.

Example 5

A liquid developer was prepared by dispersing 200 g of toner of Example 2 in 800 g of Isopar L. Obtained liquid developer was put in a developing machine, ELEFAX LP-510 manufactured by Iwatsu Electric Co., Ltd. and a latent electrostatic image was developed directly on a zinc oxide photosensitive paper to produce a metal toner image for IC tag.

Example 6

100 parts of silver particles, Ag-128 manufactured by Shoei Chemical Inc., 200 parts of stearyl methacrylate polymer and 1,000 parts of aliphatic hydrocarbon and Isopar H manufactured by Exxon Mobil Corporation were dispersed by an atrighter for 2 hours to produce a toner.

200 g of obtained toner was diluted in 1,000 g of Isopar H to produce a liquid developer.

A pattern image for IC tag was formed on a regular paper using obtained liquid developer by RICOPY DT1200 manufactured by Ricoh Company, Ltd. and evaluated. It was practically usable with a volume resistance of 0.83 Ω·cm.

Comparative Example 1

A toner was produced and developed similarly to Example 1 except for using a colorant metal powder consisting 29% aluminum and 71% tin instead of the No. 1 colorant metal powder as used in Example 1 by a conventional developing process without developing a thin layer.

Next, appropriate patterns were produced when a wiring pattern image was formed using each toner of Examples 1 to 6 and Comparative Example 1 and the volume resistance was measured referring to electric resistivity, JISC3001 of Japanese Industrial Standards. The results are shown in Table 1.

TABLE 1

| | Image Density | Resolution (lines/mm) | Sharpness | Solid Image Uniformity | Glossiness (%) | Volume Resistance (Ω·cm) | Rate of Transfer (%) | Offset |
|---|---|---|---|---|---|---|---|---|
| Example 1 | 1.34 | 7.1 | B | B | 65 | 1.23 | 95 | A |
| Example 2 | 1.49 | 7.1 | A | between A and B | 70 | 0.89 | 95 | A |
| Example 3 | 1.40 | 7.1 | B | B | 77 | 1.56 | 94 | B |
| Example 4 | 1.32 | 7.1 | C | B | 70 | 4.51 | 95 | A |
| Example 5 | 1.30 | 7.1 | C | B | 71 | 0.92 | 95 | A |
| Example 6 | 1.31 | 7.1 | B | B | 75 | 0.83 | 93 | A |
| Comp. Example 1 | 1.14 | 5.3 | D | D | 20 | 40 MΩ·cm or more | 68 | C |

In Table 1, image density was measured by JX888 by Color Techno System Corporation. Sharpness, solid image uniformity and offset were evaluated by the ranking sample with following standards:

A: Excellent B: Good C: Fair D: Poor E: Bad

Glossiness was measured by a glossmeter manufactured by Nikon Corporation.

OK Special Art paper was used as a transfer paper.

Example 7

When a latent electrostatic image was developed using the developer of Example 2 after performing 3,000V of corona discharge on the toner layer using the image forming apparatus as shown in FIG. 2, resolution was improved as shown in Table 2.

TABLE 2

| | Image Density | Resolution (lines/mm) | Sharpness | Solid Image Uniformity | Glossiness (%) | Rate of Transfer (%) | Offset |
|---|---|---|---|---|---|---|---|
| Example 7 | 1.51 | 8.0 | B | B | 73 | 95 | A |

Example 8

When a latent image on a photoconductor was developed using the developer of Example 3 after pre-wetting a silicone oil, KF-96-300CS manufactured by Shin-Etsu Chemical Co., Ltd. in a thickness of 0.5 μm by pre-wet roller F using the image forming apparatus as shown in FIG. 2, image density and rate of transfer were improved as shown in Table 3.

TABLE 3

| | Image Density | Resolution (lines/mm) | Sharpness | Solid Image Uniformity | Glossiness (%) | Rate of Transfer (%) | Offset |
|---|---|---|---|---|---|---|---|
| Example 8 | 1.56 | 7.1 | A | between A and B | 80 | 98 65 | A |

Example 9

When a latent image was developed using the developer of Example 3 and an apparatus of intermediate transfer body 13 (urethane rubber with fluorine-treated surface) as shown in FIG. 3, image density and rate of transfer were improved as shown in Table 4.

TABLE 4

| | Image Density | Resolution (lines/mm) | Sharpness | Solid Image Uniformity | Glossiness (%) | Rate of Transfer (%) | Offset |
|---|---|---|---|---|---|---|---|
| Example 9 | 1.60 | 7.1 | A | between A and B | 82 | 98 | A |

Example 10

When a latent image was developed using the developer of Example 3 after fluorine-acryl block copolymer resin, MODIPER F210 manufactured by NOF Corp. was coated on the photoconductor of the image forming apparatus as shown in FIG. 4 in a layer thickness of 3 μm to make it oil-repellent, image density and rate of transfer were improved as shown in Table 5. The contact angle with the developer was 45°.

TABLE 5

| | Image Density | Resolution (lines/mm) | Sharpness | Solid Image Uniformity | Glossiness (%) | Rate of Transfer (%) | Offset |
|---|---|---|---|---|---|---|---|
| Example 10 | 1.62 | 7.1 | A | between A and B | 83 | 99 | A |

Example 11

First, 20 parts of No. 4 colorant metal powder and 30 parts of phenol resin with a softening point of 85° C. were kneaded with a kneader at 120° C. and crushed after subjected to flushing treatment by a flusher.

Next, 60 parts of obtained crushed material, 100 parts of 20% solution of EXOL 130 manufactured by Exxon Mobile Corporation, a lauryl methacrylate glycidyl methacrylate (80/20) copolymer and 200 parts of EXOL 130 were put in a ball mill and dispersed for 72 hours and further dispersed for 1 hour with additional 300 parts of EXOL 130 to obtain an inkjet ink.

A recording test was operated using obtained ink by an inkjet printer, Sundea manufactured by Ricoh Company, Ltd.

Example 12

First, 20 parts of No. 4 colorant metal powder, 100 parts of polyester resin with a softening point of 85° C., 2 parts of charge control agent, a metallic complex of salicylic acid derivative, 50 parts of stearyl methacrylate/methacrylic acid (90/10) copolymer and 400 parts of Isopar H were dispersed in a ball mill to obtain a toner.

200 g of obtained toner was dispersed in 1,000 g of Isopar L to produce a liquid developer.

When an image was printed using obtained liquid developer by a wet printer, BP-3 manufactured by Ricoh Company, Ltd., a glossy silver print and highly conductive wiring pattern image were obtained. Moreover, they were applicable for IC tags. The results similar to BP-3 were obtained by TM-1200 manufactured by Miyakoshi Printing Machinery Co., Ltd. and EP-1000 manufactured by HPIndigo.

Example 13

First, 55 parts of colorant, Ag531 manufactured by Shoei Chemical Inc., 10 parts of rosin modified resin with a softening point of 80° C., 2 parts of charge control agent, manganese naphthenate and 100 parts of n-paraffin were dispersed in a ball mill to produce a toner.

When copies were made using obtained toner and an electrophotographic copier, RICOPY PT510 manufactured by Ricoh Company, Ltd., wiring patterns and IC tags with high glossiness and appropriate conductivity were produced.

Next, evaluation results of Examples 11 to 13 are shown in Table 6.

TABLE 6

| | Image Density | Resolution (lines/mm) | Sharpness | Solid Image Uniformity | Glossiness (%) | Rate of Transfer (%) | Offset |
|---|---|---|---|---|---|---|---|
| Example 11 | 1.21 | 6.3 | A | B | 68 | — | — |
| Example 12 | 1.35 | 5.6 | B | A | 61 | 92 | A |
| Example 13 | 1.40 | 5.6 | B | A | 73 | 93 | A |

Example 14

48 parts of AgC-AO in a spherical shape with an average particle diameter of 1.0 μm manufactured by Fukuda Metal Foil & Powder Co., Ltd., 5 parts of polyethylene, EVAFLEX 260 manufactured by Du Pont-Mitsui Polychemicals Co., Ltd. with a viscosity at 200° C. of 120 mPa·s as measured by means of HAAKE PheoStress RS50 and 5 parts of Isopar V were well mixed in a flusher (kneader) at approximately 100° C., cooled and crushed to obtain silver particles contained in a first resin.

1,500 parts of Isopar H was put in a 3 liter flask and retained at 90° C. and a mixed solution of 500 parts of lauryl methacrylate, 10 parts of glycidyl methacrylate, 5 parts of aryl methacrylate, 2 parts of acrylic acid and 3 parts of LPO (initiator) was allowed to drip for 2 hours. After dripping, it was allowed to react for approximately 1 hour and a mixed solution of 50 parts of methyl methacrylate and 3 parts of LPO was allowed to drip for approximately 1 hour. After dripping, it was allowed to react for approximately 3 hours to obtain a second resin.

50 parts of crushed first resin/silver particles, 5 parts of second resin and 200 parts of Isopar H were dispersed in a ball mill for approximately 48 hours to obtain a liquid silver concentrated toner.

100 g of the concentrated toner was diluted with 1 liter of Isopar H, an image was printed by means of the apparatus in FIG. 3 and the printed image was fixed by heat at 150° C. This was further heated at 200° C. for 5 seconds.

Example 15

48 parts of AgC-H in a spherical shape with an average particle diameter of 0.1 μm manufactured by Fukuda Metal Foil & Powder Co., Ltd., 10 parts of polyethylene, SANWAX 161P manufactured by Sanyo Chemical Industries, Ltd. with a viscosity at 200° C. of 110 mPa·s and 5 parts of Isopar V were well mixed in a flusher (kneader) at approximately 110° C., cooled and crushed to obtain silver particles contained in a first resin.

1,300 parts of Isopar H was put in a 3 liter flask and retained at 90° C. and a mixed solution of 600 parts of 2-Ethylhexyl methacrylate, 15 parts of glycidyl methacrylate, 5 parts of aryl methacrylate, 2 parts of acrylic acid and 3 parts of LPO (initiator) was allowed to drip for 2 hours. After dripping, it was allowed to react for approximately 1 hour and a mixed solution of 70 parts of methyl methacrylate and 3 parts of LPO was allowed to drip for approximately 1 hour. After dripping, it was allowed to react for approximately 3 hours to obtain a second resin.

55 parts of crushed first resin/silver particles, 3 parts of second resin and 250 parts of silicone oil 5 cst manufactured by Shin-Etsu Chemical Co., Ltd. were dispersed in a ball mill for approximately 48 hours to obtain a liquid silver concentrated toner.

100 g of the concentrated toner was diluted with 1 liter of silicone oil 5 cst, an image was printed by means of the apparatus in FIG. 3 and the printed image was fixed by heat at 150° C. This was further heated at 200° C. for 5 seconds.

Example 16

18 parts of AgC-AO in a spherical shape with an average particle diameter of 1.0 μm manufactured by Fukuda Metal Foil & Powder Co., Ltd., 31 parts of AgC-B in a flattened shape with an average particle diameter of 5.0 μm manufactured by Fukuda Metal Foil & Powder Co., Ltd., 8 parts of polyethylene, EVAFLEX260 manufactured by Du Pont-Mitsui Polychemicals Co., Ltd. with a viscosity at 200° C. of 120 mPa·s and 3 parts of Isopar M were well mixed in a flusher (kneader) at approximately 100° C., cooled and crushed to obtain silver particles contained in a first resin.

1,500 parts of Isopar H was put in a 3 liter flask and retained at 90° C. and a mixed solution of 500 parts of lauryl methacrylate, 10 parts of glycidyl methacrylate, 5 parts of aryl methacrylate, 2 parts of acrylic acid and 3 parts of LPO (initiator) was allowed to drip for 2 hours. After dripping, it was allowed to react for approximately 1 hour and a mixed solution of 50 parts of methyl methacrylate and 3 parts of LPO was allowed to drip for approximately 1 hour. After dripping, it was allowed to react for approximately 3 hours to obtain a second resin.

50 parts of crushed first resin/silver particles, 5 parts of second resin and 200 parts of Isopar H were dispersed in a ball mill for approximately 48 hours to obtain a liquid silver concentrated toner.

100 g of the concentrated toner was diluted with 1 liter of Isopar H, an image was printed by means of the apparatus in FIG. 3 and the printed image was fixed by heat at 150° C. This was further heated at 200° C. for 30 seconds.

Example 17

58 parts of AgC-AO in a spherical shape with an average particle diameter of 1.0 μm manufactured by Fukuda Metal Foil & Powder Co., Ltd., 4 parts of polyethylene, EVAFLEX220 manufactured by Du Pont-Mitsui Polychemicals Co., Ltd. with a viscosity at 200° C. of 130 mPa·s and 5 parts of polyalfaolefin SFH-20 manufactured by Exxon Mobile Corporation were well mixed in a flusher (kneader) at approximately 100° C., cooled and crushed to obtain silver particles contained in a first resin.

1,500 parts of Isopar H was put in a 3 liter flask and retained at 90° C. and a mixed solution of 400 parts of stearyl methacrylate, 10 parts of glycidyl methacrylate, 5 parts of aryl methacrylate, 2 parts of acrylic acid and 3 parts of LPO (initiator) was allowed to drip for 2 hours. After dripping, it was allowed to react for approximately 1 hour and a mixed solution of 50 parts of methyl methacrylate and 3 parts of LPO was allowed to drip for approximately 1 hour. After dripping, it was allowed to react for approximately 3 hours to obtain a second resin.

50 parts of crushed first resin/silver particles, 15 parts of second resin and 200 parts of polyalfaolefin SFH-20 manufactured by Exxon Mobile Corporation were dispersed in a ball mill for approximately 48 hours to obtain a liquid silver concentrated toner.

100 g of the concentrated toner was diluted with 1 liter of polyalfaolefin SFH-20, an image was printed by means of the apparatus in FIG. 3 and the printed image was fixed by heat at 150° C. This was further heated at 200° C. for 10 seconds.

Example 18

A test production and evaluation were conducted in a same manner as in Example 1 except polyethylene of Example 1 was changed to an epoxy resin, Epikote 1002 manufactured by Japan Epoxy Resins Co., Ltd. with a viscosity at 200° C. of 220 mPa·s.

Example 19

An evaluation was conducted in a same manner except the fixed sample in Example 1 was subjected to a calendar treatment with a pressure of 60 kg/cm$^2$n.

Example 20

An evaluation was conducted in a same manner except the fixed sample in Example 1 was developed and transferred (overprinted twice) again in a same manner.

Example 21

29 parts of AgC-BO in a spherical shape with an average particle diameter of 1.0 μm manufactured by Fukuda Metal Foil & Powder Co., Ltd., 31 parts of polyethylene, EVAFLEX260 manufactured by Du Pont-Mitsui Polychemicals Co., Ltd. with a viscosity at 200° C. of 120 mPa·s and 5 parts of Isopar V were well mixed in a flusher (kneader) at approximately 100° C., cooled and crushed to obtain silver particles contained in a first resin.

50 parts of crushed first resin/silver particles and 200 parts of Isopar H were dispersed for approximately 48 hours to obtain a liquid silver concentrated toner.

100 g of the concentrated toner was diluted with 1 liter of Isopar H, an image was printed by means of the apparatus in FIG. 3 and the printed image was fixed by heat at 150° C. This was further heated at 200° C. for 3 seconds.

Example 22

1,500 parts of Isopar H was put in a 3 liter flask and retained at 90° C. and a mixed solution of 500 parts of lauryl methacrylate, 10 parts of glycidyl methacrylate, 5 parts of aryl methacrylate, 2 parts of acrylic acid and 3 parts of LPO (initiator) was allowed to drip for 2 hours. After dripping, it was allowed to react for approximately 1 hour and a mixed solution of 50 parts of methyl methacrylate and 3 parts of LPO was allowed to drip for approximately 1 hour. After dripping, it was allowed to react for approximately 3 hours to obtain a second resin.

22 parts of the second resin, 50 parts of conductive copper powder, CE115 by Fukuda Metal Foil & Powder Co., Ltd. and 200 parts of Isopar H were dispersed in a ball mill for approximately 48 hours to obtain a liquid copper concentrated toner.

100 g of the concentrated toner was diluted with 1 liter of Isopar H, an image was printed by means of the apparatus in FIG. 3 and the printed image was fixed by heat at 150° C. This was further heated at 200° C. for 5 seconds.

Example 23

Everything was conducted in a same manner as in Example 1 except for omitting a process of heating at 200° C. for 5 seconds after fixing.

Comparative Example 2

Everything was conducted in a same manner as in Example 1 except the polyethylene (EVAFLEX260) of Example 1 was changed to Petcoal®150 manufactured by Tosoh Corp. with a viscosity at 200° C. of 550 mPa·s.

Comparative Example 3

Everything was conducted in a same manner as in Example 1 except the polyethylene (EVAFLEX260) of Example 1 was changed to Epikote825 manufactured by Japan Epoxy Resins Co., Ltd. with a viscosity at 200° C. of 8 mPa·s.

Meanwhile, silver particles were diluted with Isopar H and the average particle diameter was measured by means of a particle size distribution measurer, SA-CP3 manufactured by Shimadzu Corp. in a specified cell. The dilute concentration was 80% to 120% in detected concentration and measurement was conducted under a condition of ACCEL480, MODE: CENT and at 3 channel to 16 channel.

The viscosity of resin was measured by forming 0.8 g of resin into a pellet with a diameter of 20 mm and fixing it to a parallel plate of 20 mmΦ using RheoStress RS50 manufactured by HAAKE.

The results of evaluation for Examples and Comparative Examples are shown in Table 7.

Since viscosity at 200° C. of Example 14 was appropriate, when it was further heated at 200° C., resin fraction was transferred to the base material and the connection between silver particles in pattern portion was favorable and therefore, it excels in metallic luster and low resistive characteristic. Since the particle diameter of silver particles in Example 15 was 0.31 μm which was 0.51 μm or less, it is inferior to Example 14 having a particle diameter of 1.3 μm in quality. Example 16 contains flat particles (dl/ds=1.5, dl/dt=4.2) and it is more advantageous than Example 14 in terms of metallic luster and electric resistivity. Example 17 is inferior to Example 14 in quality because the content of the second resin in Example 17 is 50% or more of total resin content. Example 18 is also inferior in quality because the first resin is an epoxy resin. Example 19 excels in luster and value of resistance because of pressure treatment. Example 20 is more superior to Example 14 in quality because of large adhesion amount of toner.

Example 21 is low in quality because resin content relative to metal particles is large and it does not use the second resin. Example 22 is also low in quality because copper powder is used for the metallic particles which are not contained in the first resin. Example 23 lacks in luster and conductivity because it does not include heat treatment after fixing.

Comparative Example 2 is bad in quality because viscosity of Comparative Example 2 is higher than the viscosity range of the resin in the present invention and the connection between silver particles is low. Comparative Example 3 is deteriorated in quality because of runny resin which leads to a diffused image.

TABLE 7

| | Adhesion Amount of Toner after Drying (mg/cm$^2$) | Image Density | Resolution (lines/mm) | Glossiness (%) | Volume Resistance (Ω·cm) |
| --- | --- | --- | --- | --- | --- |
| Example 14 | 0.45 | 1.28 | 7.1 | 121 | 1.3 |
| Example 15 | 0.33 | 1.12 | 7.1 | 86 | 3.3 |
| Example 16 | 0.49 | 1.35 | 7.1 | 163 | 1.2 |
| Example 17 | 0.16 | 1.13 | 7.1 | 75 | 4.3 |
| Example 18 | 0.16 | 1.02 | 7.1 | 68 | 5.8 |
| Example 19 | 0.45 | 1.62 | 7.1 | 200 or more | 0.8 |
| Example 20 | 0.82 | 1.41 | 7.1 | 188 | 0.9 |
| Example 21 | 0.13 | 0.68 | 5.3 | 75 | 135 |
| Example 22 | 0.12 | 0.53 | 5.3 | 68 | 126 |
| Example 23 | 0.45 | 1.09 | 7.1 | 58 | 85 |
| Comp. Ex. 2 | 0.10 | 0.35 | 4.1 | 20 | 40 MΩ·cm or more |
| Comp. Ex. 3 | 0.09 | 0.31 | 1.1 | 22 | 3,520 |

In Table 7, image density was measured by JX888 manufactured by Color Techno System Corporation for metallic luster.

Glossiness was measured by a glossmeter manufactured by Nikon Corporation.

Resistance was measured by 4-pin probe method using MCP-T400 manufactured by Mitsubishi Chemical Corporation.

OK Special Art paper was used as a transfer base material.

What is claimed is:

1. A liquid developer for developing a latent electrostatic image, comprising a toner which is dispersed in a carrier liquid,
    wherein the toner comprises a colorant and a resin, and the colorant is an alloy comprising silver, zinc and aluminum, and
    wherein the alloy comprises 50% by mass to 95% by mass of silver, 3% by mass to 40% by mass of zinc and 0.1% by mass to 10% by mass of aluminum.

2. The liquid developer according to claim 1, wherein the carrier liquid is one of aliphatic hydrocarbon, silicone oil, liquid paraffin, polyalfaolefin and vegetable oil.

3. The liquid developer according to claim 1, wherein the viscosity of the liquid developer is 1 mPa·s to 900 mPa·s.

4. The liquid developer according to claim 1, wherein the total content of the resin and the colorant is 5% by mass or more.

5. The liquid developer according to claim 1, wherein the average particle diameter of the toner is 0.1 μm to 15 μm.

6. The liquid developer according to claim 1, wherein the colorant is an alloy further containing gold.

7. The liquid developer according to claim 1, wherein the colorant is an alloy further containing copper.

8. The liquid developer according to claim 1, wherein the colorant is an alloy further containing platinum.

9. The liquid developer according to claim 8, wherein the alloy comprises 50% by mass to 95% by mass of silver, 3% by mass to 40% by mass of zinc, 0.1% by mass to 10% by mass of aluminum and 0.1% by mass to 3% by mass of platinum.

10. The liquid developer according to claim 1, wherein the colorant is an alloy further containing nickel.

11. The liquid developer according to claim 10, wherein the alloy comprises 50% by mass to 95% by mass of silver, 3% by mass to 40% by mass of zinc, 0.1% by mass to 10% by mass of aluminum and 0.1% by mass to 3% by mass of nickel.

12. The liquid developer according to claim 1, wherein the alloy is subjected to flushing treatment.

13. The liquid developer according to claim 1, wherein the resin contains at least a first resin and a second resin, and the mass ratio of the first resin to the second resin, first resin: second resin, is 95.5 to 50:50.

14. The liquid developer according to claim 13, wherein the first resin is a polyolefin resin.

15. The liquid developer according to claim 13, wherein the first resin contains an alloy and the second resin is absorbed on the first resin.

16. The liquid developer according to claim 13, wherein the second resin is an acrylic resin.

17. The liquid developer according to claim 13, wherein the second resin comprises an area having high affinity for a dispersion medium, an area having low affinity for the dispersion medium and an area retaining an electric charge.

18. A liquid developer for developing a latent electrostatic image, comprising a toner which is dispersed in a carrier liquid,
    wherein the toner comprises a colorant and a resin and the colorant is an alloy comprising 50% by mass to 95% by mass of silver, 3% by mass to 40% by mass of zinc, 0.1% by mass to 10% by mass of aluminum and 0.1% by mass to 3% by mass of gold.

19. A liquid developer for developing a latent electrostatic image, comprising a toner which is dispersed in a carrier liquid,
    Wherein the toner comprises a colorant and a resin and the colorant is an alloy comprising 50% by mass to 95% by mass of silver, 3% by mass to 40% by mass of zinc, 0.1% by mass to 10% by mass of aluminum and 0.1% by mass to 3% by mass of copper.

20. A liquid developer for developing a latent electrostatic image, comprising a toner which is dispersed in a carrier liquid,
    Wherein the toner comprises a colorant and a resin, and the colorant is an alloy comprising silver, zinc, aluminum and platinum.

21. A liquid developer for developing a latent electrostatic image, comprising a toner which is dispersed in a carrier liquid,
    Wherein the toner comprises a colorant and a resin, and the colorant is an alloy comprising silver, zinc, aluminum and nickel.

22. A liquid developer for developing a latent electrostatic image comprising a toner which is dispersed in a carrier liquid,
    Wherein the toner comprises a colorant and a resin, and the colorant is an alloy comprising silver, zinc and aluminum, wherein the resin contains at least a first resin and a second resin, and the mass ratio of the first resin to the second resin, first resin: second resin, is 95:5 to 50:50 and wherein the second resin comprises an area having high affinity for a dispersion medium, an area having low affinity for the dispersion medium and an area retaining an electric charge.

* * * * *